US010339600B1

(12) United States Patent
Lieberman et al.

(10) Patent No.: US 10,339,600 B1
(45) Date of Patent: Jul. 2, 2019

(54) APPLICATION PLATFORM REVERSE AUCTION (71) Applicant: EMC Corporation, Hopkinton, MA (US)

(72) Inventors: Amit Lieberman, St. Kfar Sava (IL); Jehuda Shemer, St. Kfar Sava (IL); Assaf Natanzon, Tel Aviv (IL); Ron Bigman, Holon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 856 days.

(21) Appl. No.: 14/974,106

(22) Filed: Dec. 18, 2015

(51) Int. Cl.
G06Q 30/00 (2012.01)
G06Q 30/08 (2012.01)
H04L 29/08 (2006.01)
H04L 29/06 (2006.01)

(52) U.S. Cl.
CPC ............ G06Q 30/08 (2013.01); H04L 67/10 (2013.01); H04L 67/34 (2013.01); H04L 67/42 (2013.01)

(58) Field of Classification Search
CPC ............... G06Q 30/0601–0645; G06Q 30/08
USPC ................................. 705/26.1–27.2
See application file for complete search history.

(56) References Cited

U.S. PATENT DOCUMENTS

| | | | | |
|---|---|---|---|---|
| 9,210,031 B1* | 12/2015 | Kirby | ................ | H04L 29/08774 709/226 |
| 9,626,710 B1* | 4/2017 | Chheda | ................ | G06Q 20/382 705/64 |
| 2001/0056396 A1* | 12/2001 | Goino | ................ | G06Q 30/0601 705/37 |
| 2003/0055771 A1* | 3/2003 | RuDusky | ............... | G06Q 30/08 705/37 |
| 2008/0313089 A1* | 12/2008 | Du Preez | ........... | G06Q 30/0601 705/80 |
| 2009/0012868 A1* | 1/2009 | DeAngelis | ............. | G06Q 30/02 705/14.5 |
| 2011/0153449 A1* | 6/2011 | Hite | ........................ | G06Q 30/08 |
| 2012/0310764 A1* | 12/2012 | Sinsheimer | ........ | G06Q 30/0601 705/80 |
| 2013/0160008 A1* | 6/2013 | Cawlfield | ............. | G06F 9/5005 705/26.3 |

(Continued)

OTHER PUBLICATIONS

AppNet powers TelecomSmart.com for small businesses to access leading telecom carrier services. (May 3, 2000). Business Wire Retrieved from https://dialog.proquest.com/professional/docview/670744465?accountid=142257 (Year: 2000).*

(Continued)

Primary Examiner — Resha Desai
Assistant Examiner — Kennedy Gibson-Wynn
(74) Attorney, Agent, or Firm — Chamberlain, Hrdlicka, White, Williams & Aughtry (57) ABSTRACT A method for software application management includes receiving, from a client device, a software application, obtaining a software application manifest for the software application, and transmitting the software application manifest to multiple vendors. Each of the vendors includes computing system resources for hosting the software application. The method further includes receiving bids from the vendors, selecting, from the bids, a winning bid, and transmitting the software application and payment information to the vendor of the winning bid.

14 Claims, 6 Drawing Sheets (56) References Cited

U.S. PATENT DOCUMENTS

| | | | |
|---|---|---|---|
| 2014/0013308 A1* | 1/2014 | Gounares | G06F 11/3636 |
| | | | 717/125 |
| 2014/0259003 A1* | 9/2014 | Devarajan | G06F 8/65 |
| | | | 717/172 |
| 2015/0326496 A1* | 12/2015 | Ramon Salguero | ............ |
| | | | H04L 12/911 |
| 2016/0239908 A1* | 8/2016 | Dolen | G06Q 30/08 |
| 2019/0065165 A1* | 2/2019 | Troutman | G06F 8/60 |

OTHER PUBLICATIONS

"Topology and Orchestration Specification for Cloud Applications Version 1.0", OASIS Standard, Nov. 25, 2013 (114 pages).
"TOSCA Simple Profile in YAML Version 1.0", Committee Specification Draft 04/Public Review Draft 01, OASIS, Aug. 27, 2015 (264 pages).

\* cited by examiner

APPLICATION PLATFORM REVERSE AUCTION

BACKGROUND

In a cloud environment, software applications execute, at least partially, on remote devices. For example, a software application may be a web application that is served from a remote server and executes in a web browser. By way of another example, the software application may be a client application that interfaces with a remote database for data. By using cloud computing system resources, software applications are not limited to local resources.

BRIEF DESCRIPTION OF DRAWINGS

FIGS. 6.1 and 6.2 show a computing system in accordance with one or more embodiments of the technology.

DETAILED DESCRIPTION

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, as used herein, a user (e.g., a vendor, client, or another) is considered to perform an action when the user performs the action directly or the action is performed on behalf of the user, such as in a formal or informal agency relationship. For example, a user may perform the action when an employee, friend, or other individual or computing system performs the action for the user.

In general, embodiments of the technology are directed to a reverse auction of computing system resources. In particular, in order to deploy a software application to the cloud, a vendor of the computing system resources is selected. One or more embodiments are directed to a technique for selecting a vendor of the computing system resources by having an intermediary manage a reverse auction for the vendor. More specifically, the client provides the software application to the intermediary. The intermediary publishes a software application manifest for the software application. At least based on the manifest, vendors may bid a price for executing the software application on the vendor's computing resources. The intermediary may deploy the software application to the winning vendor. Further, the intermediary may manage the payment from the client to the winning vendor for the deployment of the software application.

Figure 1:
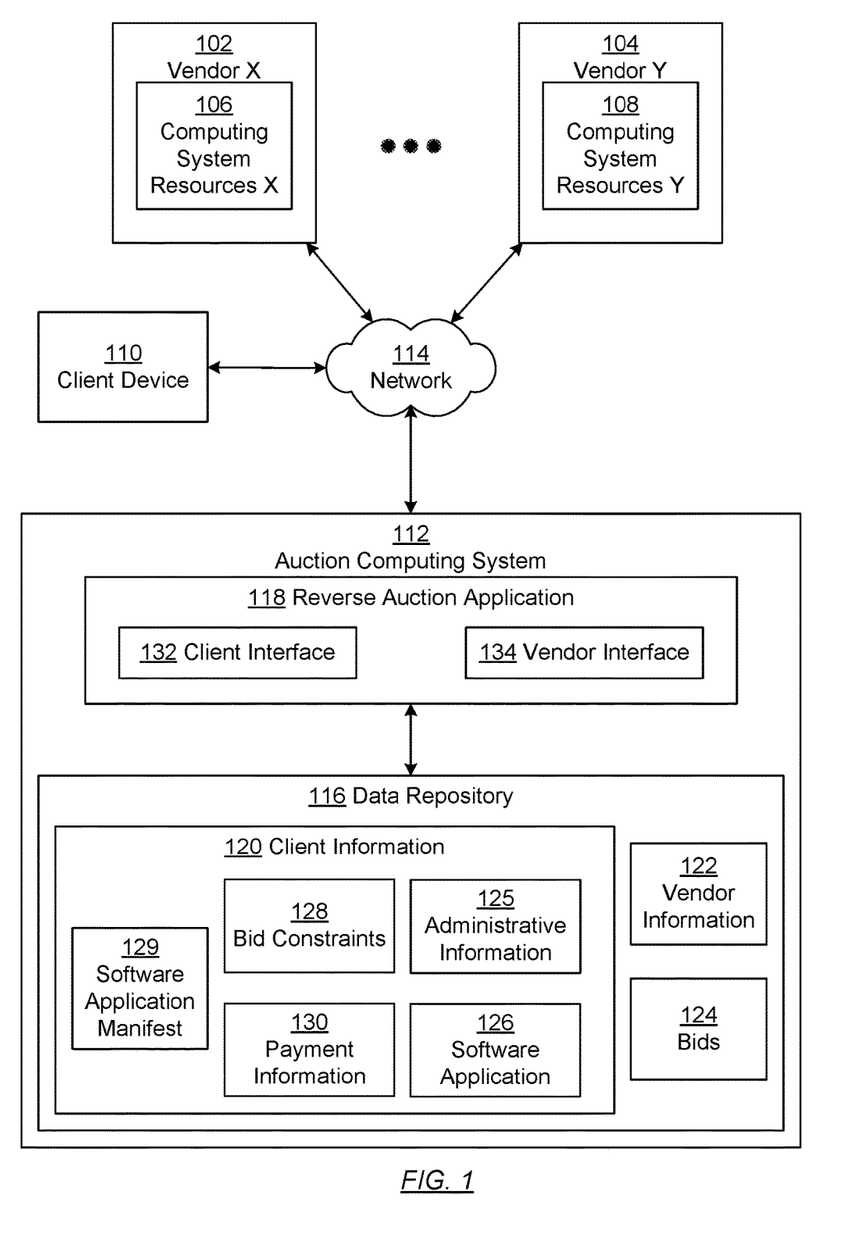
FIG. 1 shows a schematic diagram of a system in accordance with one or more embodiments of the technology.
Figure 61:
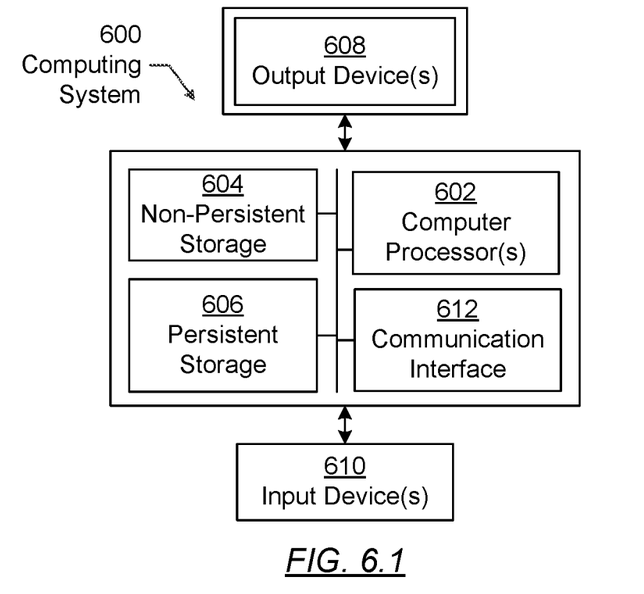
Figure 62:
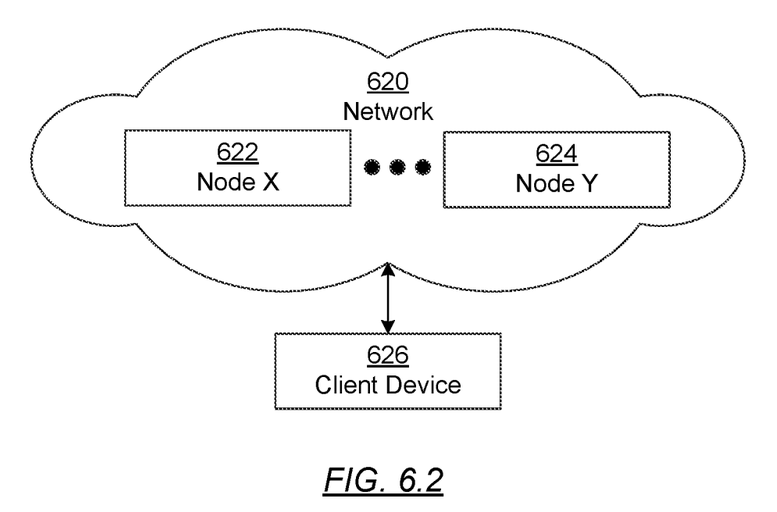

FIG. 1 shows a schematic diagram of a system in accordance with one or more embodiments of the technology. As shown in FIG. 1, the system may include one or more of vendors (e.g., vendor X (102), vendor Y (104)) having computing system resources (e.g., computing system resources X (106), computing system resources Y (108)), a client device (110), and an auction computing system (112). The various computing devices and computing system resources (e.g., computing system resources X (106), computing system resources Y (108)) in FIG. 1 may correspond to the computing system shown in FIGS. 6.1 and 6.2. Each of the components of FIG. 1 is described below.

In one or more embodiments of the technology, a vendor (e.g., vendor X (102), vendor Y (104)) is any entity that provides computing system resources (e.g., computing system resources X (106), computing system resources Y (108)) for payment (e.g., monetary or in kind). For example, a vendor may be a large corporation, a small business entity, an individual having a computing system, or other entity. A computing system resource is any hardware and/or software resources that the vendor provides for purchase. For example, the computing system resources (e.g., computing system resources X (106), computing system resources Y (108)) may include storage, processing time, number of processors, website hosting services, authentication management, electronic commerce (ecommerce) services, logging services, network bandwidth allocation, database management services, and other computing system resources. The vendor may or may not own the computing system resources (e.g., computing system resources X (106), computing system resources Y (108)). For example, the vendor may be a contractor of resources that subcontracts resources to other entities. As a more specific example, the vendor may be a contractor that joins processing time on computing systems of individuals. In some embodiments, the vendor may be a collection of business entities, which together form the vendor. In such a scenario, the auction computing system may be configured to combine individual bids from the multiple business entities into a single bid.

The vendor (e.g., vendor X (102), vendor Y (104)) may interface with the auction computing system (112) (discussed below) through a vendor device (not shown). The vendor device may correspond to a computing system shown in FIGS. 6.1 and 6.2. Further, the vendor device may include all or a portion of the computing system resources (e.g., computing system resources X (106), computing system resources Y (108)). Additionally or alternatively, the vendor device by which the vendor interacts with the auction computing system may include one or more distinct devices from the computing system resources (e.g., computing system resources X (106), computing system resources Y (108)).

Continuing with FIG. 1, the client device (110) is a computing system that is used by a client. In other words, the client device may be a computing system that is configured to develop and/or deploy, directly or indirectly, the software application to the auction computing system. For example, the client device may store the software application and upload the software application from the client device. By way of another example, the client device may by a computing device that requests deployment from a separate device (not shown) that may or may not be controlled by the client. The client (not shown) is any entity that pays for computing system resources to execute a software application. In other words, the client may be an individual, an organization, or a business entity. For example, the client may be a developer of the software application, a software application vendor, a purchaser of the software application that uses computing system resources to execute the software application, or another entity that uses computing system resources. In one or more embodiments of the technology, the client is a separate and distinct entity from the vendor. In other words, the vendor is a third party to the client. Although FIG. 1 shows a single client device, multiple client devices may exist and may be used by the same client during the same transaction. Further, although the above description is with respect to a single client, multiple clients may exist. For example, the system may be configured to manage hundreds or thousands of clients concurrently.

The client device (110) and vendor (e.g., vendor X (102), vendor Y (104)) are operatively connected to an auction computing system (112) via network (114). The operative connection is any connection by which information is communicated. For example, an operative connection may be direct or indirect and temporary, semi-permanent, or permanent. The network may include one or more of a local area network, wide area network, telecommunications network, any other network, or any combination thereof.

Continuing with FIG. 1, the auction computing system (112) is a computing system that is an intermediary between the client device (110) and the vendors (e.g., vendor X (102), vendor Y (104)). The auction computing system includes functionality to manage a reverse auction between the vendors and the client device (110). The auction computing system includes a data repository (116) and a reverse auction application (118).

In one or more embodiments of the technology, the data repository (116) is any type of storage unit and/or device (e.g., a file system, database, collection of tables, or any other storage mechanism) for storing data. Further, the data repository (116) may include multiple different storage units and/or devices. The multiple different storage units and/or devices may or may not be of the same type or located at the same physical site. In one or more embodiments of the technology, the data repository (116) includes functionality to store client information (120) for each client, vendor information (122), and bids (124). Client information (120) includes any information that is for a particular client. For example, the client information may include the software application (126), administrative information (125), bid constraints (128), and payment information (130).

A software application (126) is any set of instructions for execution in the cloud. In other words, the software application (126) is a set of instructions that at least partially uses computing system resources (e.g., computing system resources X (106), computing system resources Y (108)) to execute. For example, the software application may be a web application, combined local and remote program, whereby the local program executes on an end-user device and the remote program executes on the computing system resources, a website, a simulation application that may provide simulations for a single or multiple end users, or any other type of software application that uses computing system resources.

Administrative information (125) includes information describing the client. For example, the administrative information (125) may include a physical address, a billing address, electronic mail (email) address, name, authentication credentials (e.g., username and password, biometric identifier, other authentication credential, or any combination thereof), unique identifier, age, type of client (e.g., individual, non-profit organization, business entity), service sector of the client (e.g., school, manufacturing, health, law, etc.), or any other information describing the client.

In one or more embodiments of the technology, bid constraints (128) include any constraints on the bid. For example, the bid constraints (128) may include deployment time, maximum price, minimum service level (e.g., minimum bandwidth, maximum delay, reliability of the computing system resources, other service level constraints, or any combination thereof) auction end time, auction start time, vendors identifiers of acceptable vendors, types of vendors, size of acceptable vendors, minimum rating of an acceptable vendor, any other constraints on the bid, or any combination thereof. For example, the deployment time may be a date and/or time in which the software application is deployed to the computing system resources. The auction start and end time are dates/time that specify the time period by which vendors may submit one or more bids (124) (discussed below). The deployment time may be the auction end time or may be a time after the auction end time. The maximum price is the maximum price that the client is willing to pay for the computing system resources (e.g., computing system resources X (106), computing system resources Y (108)). For example, the maximum price may be a monetary value or an amount of in-kind resources. The minimum service level is the minimum amount of allocated resources that the client is willing to accept for the software application. In one or more embodiments of the technology, the various bid constraints (128) are maintained on a per deployment of a software application (126) basis. Thus, if the client has multiple software applications, each software application may have distinct bid constraints. Similarly, if the client is requesting multiple deployments of the same software application, each deployment may have separate bid constraint. One or more of the constraints may be defined as default constraints for the client or multiple clients. For example, the auction computing system (112) may have defined default constraints that are default for multiple clients and may be adjusted by each client. By way of another example, a single client may define one or more constraints that are used as default and may be adjusted by a client for different deployments.

In one or more embodiments of the technology, the software application manifest (129) includes a description of computing system resources used by the software application (126). For example, the software application manifest may include the type of services used by the software application, the tier of services, operating systems, database, administrative properties, configurations, and any other information about the software application. By way of an example only, the software application manifest may comply with OASIS™ Topology and Orchestration Specification for Cloud Applications (TOSCA) as described in "TOSCA Simple Profile in YAML Version 1.0," edited by Derek Palma, Matt Rutkowski, and Thomas Spatzier, OASIS Committee Specification Draft 04 (27 Aug. 2015), which is hereby incorporated by reference. OASIS™ is a trademark of OASIS Open, located in Burlington Mass. In particular, TOSCA may be used to describe the various requirements for the computing system resources. In the example, the software application manifest may be in conformance with the TOSCA standard and may include additional specification that is not in conformance with the TOSCA standard without departing from the scope of the technology.

In one or more embodiments of the technology, payment information (130) is information describing a payment method for the client. For example, the payment information may include a financial institution name, routing number, owner of the account, account number, credit card information, payment intermediary information, and/or any other information that defines a payment method. In one or more embodiments of the technology, the payment information (130) is complete in that the client does not need to provide any additional information in order for the payment to be processed.

Vendor information (122) includes information describing a vendor (e.g., vendor X (102), vendor Y (104)) in accordance with one or more embodiments of the technology. For example, the vendor information may include administrative information, payment receipt information, ratings and/or reviews of the vendor, usage statistics, and other statistics about the vendor, and any other information. For example, similar to the client administrative information, the vendor administrative information may include a physical address, a billing address, electronic mail (email) address, name, authentication credentials (e.g., username and password, biometric identifier, other authentication credential, or any combination thereof), unique identifier, age, type of vendor (e.g., individual, non-profit organization, business entity), any other information describing the vendor, or any combination of information. The reviews and/or ratings may correspond to feedback from clients and/or other vendors. For example, the reviews may be textual reviews, audio reviews, or any other types of reviews. The ratings may be individual or aggregated ratings of the vendor. For example, the ratings may be on a defined scale.

The bids (124) are bids provided from the vendors for a particular deployment of the software application (126). In other words, a bid may be related in the data repository to the vendor that submitted the bid and a deployment of the software application. In some embodiments, the bids may specify only a price. In other embodiments, the bids may specify additional information, such as service level, the services being contracted by the bid, the amount of each computing system resource, other information describing the bid, or any combination thereof.

In one or more embodiments of the technology, the data repository (116) is operatively connected to a reverse auction application (118). In one or more embodiments of the technology, the reverse auction application (118) is an application that is configured to manage a reverse auction for computing system resources. The reverse auction application (118) may include a client interface (132) and a vendor interface (134). The client interface (132) and/or vendor interface (134) may include a user interface having user interface widgets (e.g., buttons, text boxes, drop down boxes, etc.) and/or an application programming interface for interfacing with an application. For example, the client interface may include an application programming interface (132) that includes functionality to interface with an integrated development environment on the client device for receiving the software application and the bid constraints. The vendor interface (134) may include functionality to receive registrations from vendors with vendor information, transmit requests for bids to vendors, and receive bids from vendors.

While FIG. 1 shows a configuration of components, other configurations may be used without departing from the scope of the technology. For example, various components may be combined to create a single component. As another example, the functionality performed by a single component may be performed by two or more components.

Figure 2:
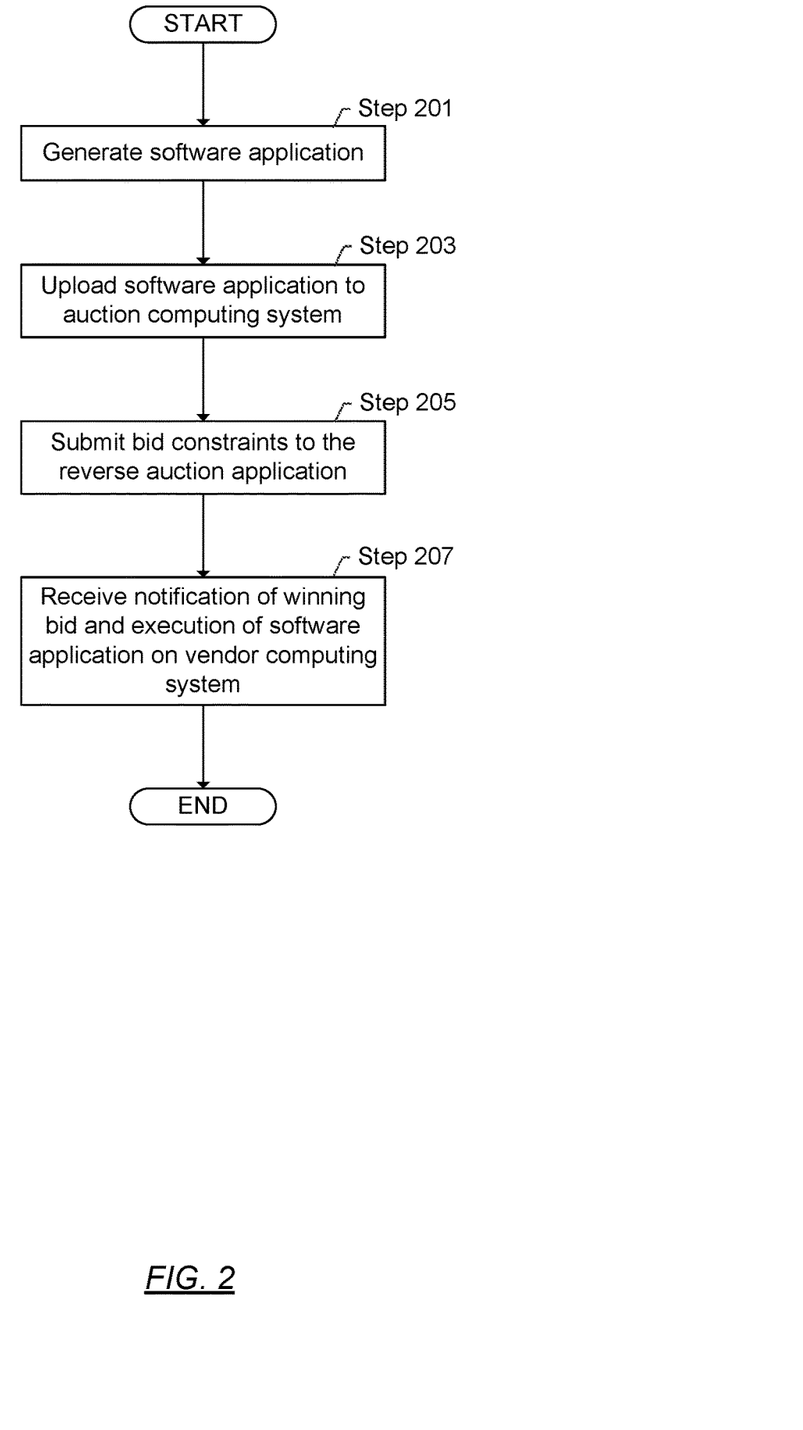
FIGS. 2-4 show flowcharts in accordance with one or more embodiments of the technology.
Figure 3:
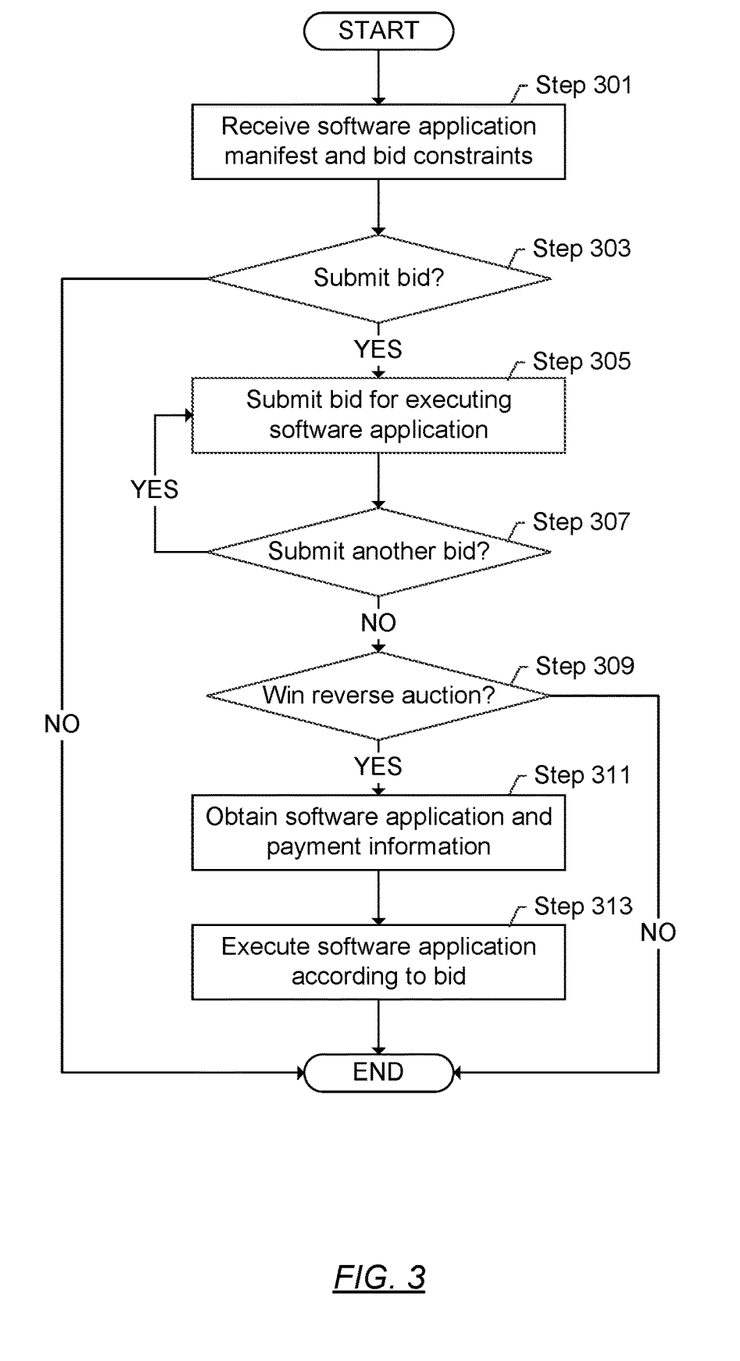
Figure 4:
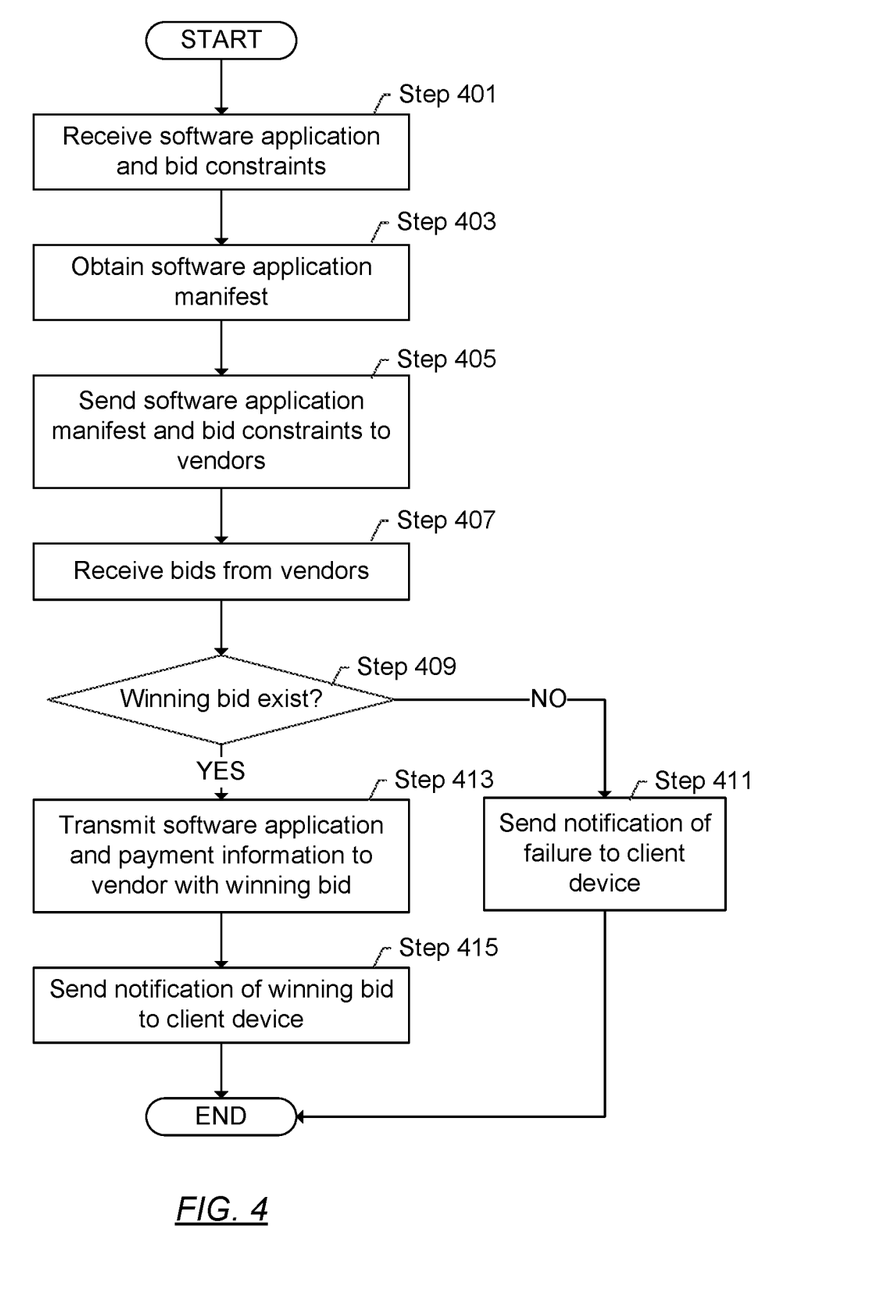

FIGS. 2, 3, and 4 show flowcharts in accordance with one or more embodiments of the technology. In particular, FIG. 2 shows a flowchart describing operations that a client performs using a client device shown in FIG. 1 in accordance with one or more embodiments of the technology. FIG. 3 shows a flowchart describing operations that a vendor in FIG. 1 performs using a vendor device in accordance with one or more embodiments of the technology. FIG. 4 shows a flowchart describing operations that an auction computing system in FIG. 1 performs to manage an reverse auction of computing system resources in accordance with one or more embodiments of the technology. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

FIG. 2 shows a flowchart for a client using a client device to request and obtain computing system resources in accordance with one or more embodiments of the technology. In Step 201, a software application is generated in accordance with one or more embodiments of the technology. For example, the client may develop the software application directly, contract another to develop the software application, purchase a previously generated software application or perform another action. If the client develops the software application, the client may develop the software application in an integrated development environment on the client device.

In Step 203, the software application is uploaded to the auction computing system in accordance with one or more embodiments of the technology. For example, a client using the client device may request that the application is uploaded. The client may submit the request in the integrated development environment. In such a scenario, the integrated development environment may interface with the application programming interface of the reverse auction application to upload the application. By way of another example, the client may access a graphical user interface and submit the location identifier of the software application. In such an example, the reverse auction application may obtain the software application from the location identified by the location identifier. In one or more embodiments of the technology, the version of the software application that is uploaded is an application binary that is ready for execution. The version of the software application that is uploaded may include a single file or multiple files. Different techniques may be used to transfer data, such as the location identifier and the software application between computing systems, such as the client device and the reverse auction system. Example techniques are described below with reference to FIGS. 6.1 and 6.2.

In Step 205, the bid constraints are submitted to the reverse auction application in accordance with one or more embodiments of the technology. In other words, the client may use the client user interface to submit the bid constraints directly or indirectly. For example, the client may submit the bid constraints directly in graphical user interface widgets using the client device, by entering the bid constraints directly into text boxes, drop down menus, and other widgets. By way of another example, the client may specify the location in which the bid constraints may be found in accordance with one or more embodiments of the technology. In some embodiments, the client may indirectly specify the bid constraints by identifying a location of a file having the bid constraints. Any network based communication protocol may be used to transfer the bid constraints from the client device to the reverse auction system. By specifying the bid constraints, the client may define parameters for an acceptable bid.

In Step 207, the client device receives notification of the winning bid and execution of the software application on the vendor computing system in accordance with one or more embodiments of the technology. In other words, information about the winning bid is transmitted to the client device. The client device presents the winning bid to the user and the notification of acceptance. For example, the winning bid may be displayed in a graphical user interface. Because the reverse auction application manages the reverse auction for executing the software application on the computing system resources, the client may receive the lowest bid with minimum overhead of formulating the software application for the different computing system resources.

In some embodiments, when the client specifies the bid constraints, the client authorizes the acceptance of any bid complying with the bid constraints. In such a scenario, upon accepting the winning bid, the reverse auction application provides the vendor with the software application for execution without first obtaining client approval. In other embodiments, the winning bid is transmitted to the client via the client device for approval and a time limit for approval. In such a scenario, the reverse auction application only approves of the winning bid after first receiving client approval in one or more embodiments of the technology.

FIG. 3 shows a flowchart for a vendor to bid on computing system resources in accordance with one or more embodiments of the technology. In Step 301, a software application manifest and bid constraints are received. In one or more embodiments, the vendor receives the request for resources from the reverse auction system. The request includes the software application manifest and the bid constraints. Using the software application manifest, the vendor may determine what computing system resources are needed to execute the software application. The vendor may further use the bid constraints to determine whether offering a bid would be profitable to the vendor.

Thus, in Step 303, the vendor makes a determination whether to submit a bid for the computing system resources. If the vendor decides that the bidding is not profitable, the flow may proceed to end for the vendor. Other vendors may continue to bid for executing the software application.

In Step 305, if the vendor decides to bid, the vendor submits the bid for executing the software application. In other words, using the vendor user interface, the vendor may submit the bid. In the bid, the vendor may specify a price. The vendor may also specify a service level and other aspects of the bid. After submitting the bid, other vendors may also submit bids. Thus, the vendor may continue to receive notifications, such as by periodically checking the reverse auction application for the current optimal bid, by receiving automated notifications when a more optimal bid is received by the system, or by another notification mechanism. In Step 307, a determination is made whether to submit another bid. For example, if the vendor receives a notification that the vendor's bid is suboptimal as compared to other vendors, the vendor may decide to submit a new bid. In such a scenario, the flow may proceed back to Step 305. Alternatively, the vendor may decide that any additional bid would not be profitable for the vendor. In such a scenario, the vendor may decide not to submit a new bid. Alternatively, the prior submitted bid from the vendor may be the optimal bid, and no other bid should be submitted. Various other reasons may exist for the vendor to submit or not to submit a new bid. The reverse auction allows the vendor to submit multiple bids.

In Step 309, a determination is made whether the vendor won the reverse auction. If the vendor did not win the reverse auction, the flow may proceed to end. If the vendor won the reverse auction, the flow may proceed to Step 311. In Step 311, the vendor obtains the software application and the payment information in accordance with one or more embodiments of the technology. For example, the software application may be transmitted as data through the network and stored on the vendor's computing system. The payment information may or may not be the payment information provided by the client. In other words, reverse auction application may bill the client directly according to the winning bid and transmit the payment to the vendor using a financial network. By way of another example, the client's payment information may be transmitted to the vendor and the vendor may charge the client directly using the client's payment information.

In Step 313, the vendor executes the software application according to the bid. In other words, the vendor allocates the computing system resources to the client as defined by the bid. By the reverse auction system connecting vendors and clients, smaller and lesser known vendors may be able to market to a large number of clients. In other words, one or more embodiments may allow the smaller vendors to have access to clients of whom the vendors may otherwise not be aware.

In some embodiments, the flow in FIG. 3 may be automated. In other words, software code executing algorithms on the vendor's computing system or on the reverse auction application may perform the Steps of FIG. 3 without human interaction. The vendor may provide the software instructions with configuration parameters defining when to offer a bid in terms of available computing system resources, how to set the price in the bid, and other configuration parameters.

FIG. 4 shows a flowchart for an auction computing system in accordance with one or more embodiments of the technology. In Step 401, a software application and bid constraints are received in accordance with one or more embodiments of the technology. The client may request a new software application is executed or a new deployment of a previously stored software application. If a new software application, through the client interface, information about the location of the software application and bid constraints are received. Thus, the software application may be uploaded to the system using techniques for data transmission (e.g., the client partitioning the software application into packets, creating a session between the client and the reverse auction system, receiving each packet via the network, and combining the packets back into the software application). Various techniques and protocols may be used to receive the software application and bid constraints in accordance with one or more embodiments of the technology. If redeployment of an existing software application is requested, then new bid constraints may optionally be received as well as an identifier of the existing software application.

In Step 403, the software application manifest is obtained in accordance with one or more embodiments of the technology. In some embodiments, the reverse auction application may analyze the software application to generate the software application manifest. Analyzing the software application may further include interfacing with a developer to obtain an expected number of communications with the software application. Further, analyzing the software application may include determining, based on the instructions in the software application, the amount of data storage, processing cycles, and other resource requirements for the software application. By way of another example, obtaining the software application manifest may include receiving the software application manifest from the client device. For example, the client device may generate the software application manifest. In some embodiments, the software application manifest is written in a standardized programming language.

In Step 405, the software application manifest and the bid constraints are sent to vendors in accordance with one or more embodiments of the technology. In one or more embodiments, when the vendor registers with the auction computing system, the vendor includes a hook for receiving requests for bids. Thus, when a new request for computing system resources is received, the reverse auction application processes each hook and transmits the software application manifest and bid constraints to each vendor accordingly.

In Step 407, bids are received from the vendors in accordance with one or more embodiments of the technology. As discussed above, through the vendor interface, the reverse auction application may receive the bids from the various vendors. The reverse auction application may automatically discard bids that do not comply with the bid constraints. Alternatively, the reverse auction application may only discard bids when a winning bid complying with the reverse auction application does not exist.

In Step 409, a determination is made whether the winning bid exists in accordance with one or more embodiments of the technology. In other words, a determination is made whether a bid exists that complies with the bid constraints. If a winning bid does not exist, the notification of failure is sent to the client device in Step 411 in accordance with one or more embodiments of the technology. In other words, within the user interface, the client may be notified of the failure. The notification may include information about an optimal bid that does not comply with the bid constraints. Thus, the client may determine whether to accept the optimal bid even when the optimal bid does not comply with the bid constraints.

Returning to Step 409, if a bid complying with the bid constraints does exist, then an optimal bid is selected in accordance with one or more embodiments of the technology. Selecting the optimal bid may be performed by selecting the bid having the lowest price. In other embodiments, a weighted function is computed on the bids to select the optimal bids. The weighted function may use, as parameter, the amount of throughput, processing power, processing speed, price, and other parameters in calculating the value of the weighted function. The weights may be received from the client via the client interface. The bid with the most optimal value of the function may be selected by the reverse auction application.

If a winning bid exists, the software application and payment information is transmitted to the vendor with the winning bid in Step 413 in accordance with one or more embodiments of the technology. In other words, the reverse auction application requests deployment to the vendor having the winning bid. The reverse auction application may request and obtain approval from the client prior to accepting the winning bid in some embodiments. In other embodiments, the acceptance and transference of the reverse auction application is performed automatically without waiting for client approval.

In Step 415, a notification of the winning bid is sent to the client device in accordance with one or more embodiments of the technology. In other words, the reverse auction application sends a notification to the client device of the winning bid and the parameters of the winning bid. In some embodiments, after receiving the notification, the client communicates directly with the vendor corresponding to the winning bid. In other embodiments, the reverse auction application continues to act as an intermediary for the deployment of the software application.

Although the above is discussed with respect to a single winning bid, multiple winning bids may exist. For example, the reverse auction application may combine bids and the computing system resources from multiple vendors (e.g., vendors that are independently only capable of providing a limited number of the requested or required resources) into a virtual set of computing system resources that together satisfy the software application manifest and the bid constraints. In such a scenario, the reverse auction application may present, to the client, a single combined bid or the multiple bids.

Figure 5:
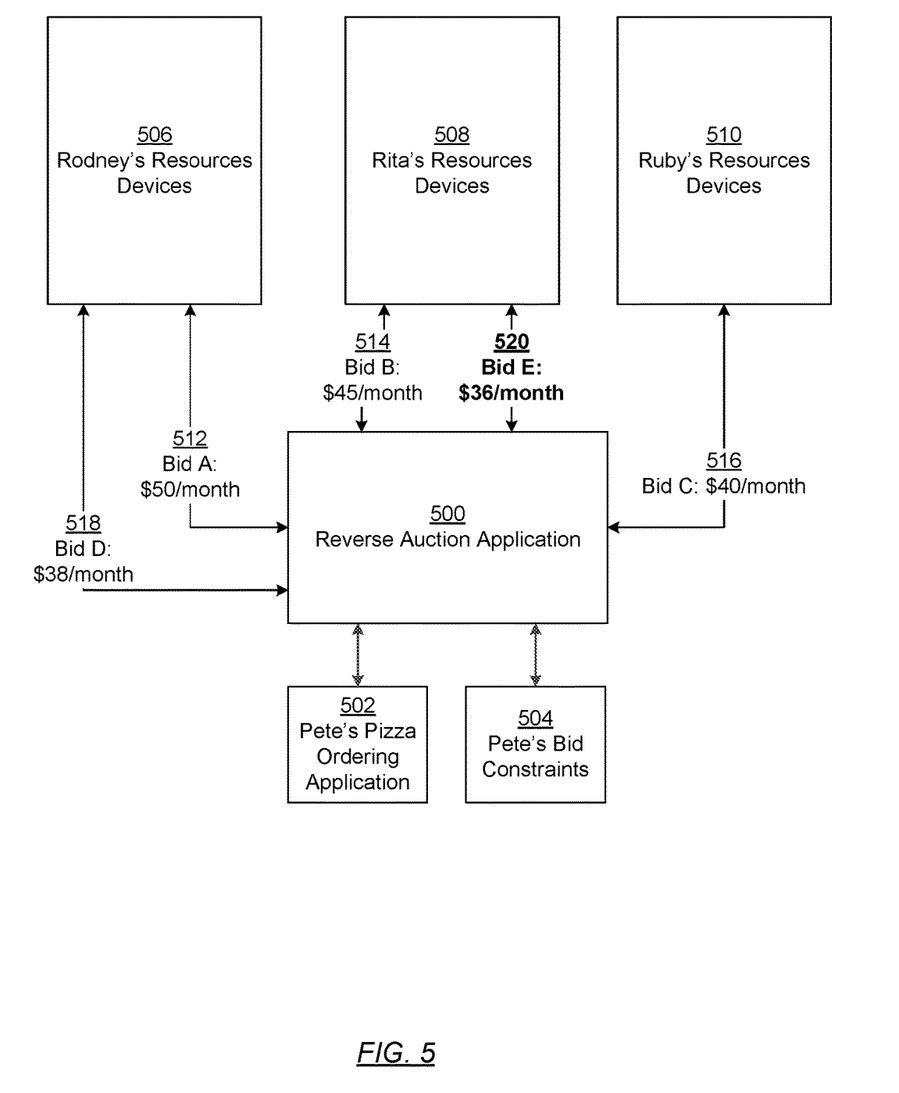
FIG. 5 shows an example in accordance with one or more embodiments of the technology.

FIG. 5 shows an example in accordance with one or more embodiments of the technology. The example shown in FIG. 5 may be an example using the system described in FIG. 1 and follow the flows set forth in FIGS. 2-4. The following example is for explanatory purposes only and not intended to limit the scope of the technology. For the purpose of the example, consider the scenario in which a reverse auction application (500) is managing bids for Pete's Pizza. In other words, Pete's Pizza has obtained a Pete's Pizza ordering application (502), which is a web application for customers to order pizza. Pete's Pizza uploads Pete's Pizza ordering application (502) and Pete's bid constraints (504) to the reverse auction application (500). The reverse auction application sends a manifest for Pete's Pizza ordering application (502) and Pete's bid constraints (504) to each of the vendors (e.g., Rodney's resources devices (506), Rita's resources devices (508), Ruby's resources devices (510)). In response, Rodney's resources devices (506) issues bid A of $50/month (512) to host Pete's Pizza ordering application (502) and perform database management therefore. When Rita's resources devices (508) sees bid A, Rita's resources devices (508) issues bid B of $45/month (514). Ruby's resources devices (510) issues bid C of $40/month (516). In response to bid C, Rodney's resource devices (506) issues bid D of $38/month (518). In response to bid D, Rita's resources devices (508) issues bid E of $36/month (520). Deciding not to reduce the price, Rodney's resources devices (506) and Ruby's resources devices (510) do not reduce the price further. Thus, Rita's resource devices (508) has the winning bid and the Pete's Pizza ordering application executes on Rita's resource devices (508).

Embodiments of the technology may be implemented on a computing system. Any combination of mobile, desktop, server, router, switch, embedded device, or other types of hardware may be used. For example, as shown in FIG. 6.1, the computing system (600) may include one or more computer processor(s) (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), and a communication interface (e.g., Bluetooth interface, infrared interface, network interface, optical interface, etc.) (612), and numerous other elements and functionalities.

The computer processor(s) (602) may be an integrated circuit for processing instructions. For example, the computer processor(s) may be one or more cores or micro-cores of a processor. The computing system (600) may also include one or more input device(s) (610), such as a touchscreen, keyboard, mouse, microphone, touchpad, electronic pen, or any other type of input device.

The communication interface (612) may include an integrated circuit for connecting the computing system to a network (not shown) (e.g., a local area network (LAN), a wide area network (WAN) such as the Internet, mobile network, or any other type of network) and/or to another device, such as another computing device.

Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The input and output device(s) may be locally or remotely connected to the computer processor(s) (602), non-persistent (604) and persistent (606) storage device(s). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform one or more embodiments of the technology.

The computing system (600) in FIG. 6.1 may be connected to or be a part of a network. For example, as shown in FIG. 6.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments of the technology may be implemented on a node of a distributed system that is connected to other nodes. By way of another example, embodiments of the technology may be implemented on a distributed computing system having multiple nodes, where each portion of the technology may be located on a different node within the distributed computing system. Further, one or more elements of the aforementioned computing system (600) may be located at a remote location and connected to the other elements over a network.

Although not shown in FIG. 6.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6.1. Further, the client device (626) may include and/or perform all or a portion of one or more embodiments of the technology.

The computing system or group of computing systems FIGS. 6.1 and 6.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces, or communication channel endpoints, enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seeks data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to server process. Upon receiving the data request, the server process analyzes the request and gathers the requested data. Finally, the server process then generates a reply including at least the requested data, and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment, by one process, may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the technology. The processes may be part of the same or different application and may execute on the same or different computing system.

Rather than or in addition to sharing data between processes, the computing system performing one or more embodiments of the technology may include functionality to receive data from a user. For example, in one or more embodiments, a user may submit data via a graphical user interface on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from local memory by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system in performing one or more embodiments of the technology may extract one or more data items from the obtained data. For example, the extraction may be performed as follows by the computing system in FIG. 6.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string, or may be a query presented to a structured data repository (where the data repository may be organized according to a database schema or data format, such as XML).

The extracted data may be used for further processing by the computing system. For example, the computing system of FIG. 6.1 while performing one or more embodiments of the technology may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate if the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the technology, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from storage and perform computations to respond to the query. The DBMS may return the result(s) to the user or software application.

The computing system of FIG. 6.1 may include functionality to present raw and/or processed data, such as results of comparisons and other processing. For example, presenting data may be accomplished through various presenting methods. Specifically, data may be presented through a user interface provided by a computing device. The user interface may include a graphical user interface (GUI) that displays information on a display device, such as a computer monitor or a touchscreen on a handheld computer device. The graphical user interface may include various graphical user interface widgets that organize what data is shown as well as how data is presented to a user. Furthermore, the graphical user interface may present data directly to the user, e.g., data presented as actual data values through text, or rendered by the computing device into a visual representation of the data, such as through visualizing a data model.

For example, a graphical user interface may first obtain a notification from a software application requesting that a particular data object be presented within the graphical user interface. Next, the graphical user interface may determine a data object type associated with the particular data object, e.g., by obtaining data from a data attribute within the data object that identifies the data object type. Then, the graphical user interface may determine any rules designated for displaying that data object type, e.g., rules specified by a software framework for a data object class or according to any local parameters defined by the graphical user interface for presenting that data object type. Finally, the graphical user interface may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 6.1 and the nodes and/or client device in FIG. 6.2. Other functions may be performed using one or more embodiments of the technology.

Although the above example has only a few vendors, one or more embodiments may connect hundreds or thousands of vendors to a client. In other words, one or more embodiments may connect small vendors to the client.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for software application management comprising:
   receiving, from a client device, a software application;
   generating a software application manifest for the software application, the software application manifest comprising:
      an expected number of communications with the software application,
      an amount of data storage for the software application, and
      an amount of processing cycles for the software application;
   transmitting the software application manifest and bid constraints associated with the software application to a plurality of vendors, wherein each of the plurality of vendors comprises computing system resources for hosting the software application;
   receiving a plurality of bids from the plurality of vendors;
   selecting, from the plurality of bids, a winning bid, the winning bid from a vendor of the plurality of vendors; and
   transmitting the software application and payment information to the vendor,
   wherein the plurality of bids from the plurality of vendors are received prior to any portion of the software application being transmitted to the plurality of vendors.

2. The method of claim 1, wherein the bid constraint is a time limit of the winning bid.

3. The method of claim 1, wherein the bid constraint is a maximum price of the winning bid.

4. The method of claim 1, wherein the bid constraint is a deployment time.

5. The method of claim 1, wherein transmitting the software application manifest to the plurality of vendors is performed based on receiving a registration with a hook from each of the plurality of vendors.

6. The method of claim 1, further comprising:
   after selecting the winning bid, transmitting the winning bid to the client device for approval; and
   receiving the approval from the client device, wherein the software application is transmitted to the vendor in response to the approval.

7. A system for software application management comprising:
   a computer processor; and
   memory storing a reverse auction application, the reverse auction application that, when executes on the computer processor:
      receives, from a client device, a software application;
      generates a software application manifest for the software application, the software application manifest comprising:
         an expected number of communications with the software application,
         an amount of data storage for the software application, and
         an amount of processing cycles for the software application;
      transmits the software application manifest and bid constraints associated with the software application to a plurality of vendors, wherein each of the plurality of vendors comprises computing system resources for hosting the software application;
      receives a plurality of bids from the plurality of vendors;

selects, from the plurality of bids, a winning bid, the winning bid from a vendor of the plurality of vendors; and transmits the software application and payment information to the vendor, wherein the plurality of bids from the plurality of vendors are received prior to any portion of the software application being transmitted to the plurality of vendors.

8. The system of claim 7, further comprising:

a data repository for storing the software application and the payment information, wherein the software application is transmitted from the data repository.

9. A non-transitory computer readable medium for software application management comprising instructions for:

receiving, from a client device, a software application;

generating a software application manifest for the software application, the software application manifest comprising, the manifest comprising:

an expected number of communications with the software application, an amount of data storage for the software application, and an amount of processing cycles for the software application;

transmitting the software application manifest and bid constraints associated with the software application to a plurality of vendors, wherein each of the plurality of vendors comprises computing system resources for hosting the software application;

receiving a plurality of bids from the plurality of vendors;

selecting, from the plurality of bids, a winning bid, the winning bid from a vendor of the plurality of vendors;

transmitting the software application and payment information to the vendor, wherein the plurality of bids from the plurality of vendors are received prior to any portion of the software application being transmitted to the plurality of vendors.

10. The non-transitory computer readable medium of claim 9, wherein the bid constraint is a time limit of the winning bid.

11. The non-transitory computer readable medium of claim 9, wherein the bid constraint is a maximum price of the winning bid.

12. The non-transitory computer readable medium of claim 9, wherein the bid constraint is a deployment time.

13. The non-transitory computer readable medium of claim 9, wherein transmitting the software application manifest to the plurality of vendors is performed based on receiving a registration with a hook from each of the plurality of vendors.

14. The non-transitory computer readable medium of claim 9, further comprising instructions for:

after selecting the winning bid, transmitting the winning bid to the client device for approval; and receiving an approval from the client device, wherein the software application is transmitted to the vendor in response to the approval.

\* \* \* \* \*